Sept. 19, 1933. J. MUROS Re. 18,955

SAFETY RAZOR

Original Filed June 22, 1932

Inventor

Joseph Muros.

by H. W. Fenwick

Attorney

Reissued Sept. 19, 1933 Re. 18,955

UNITED STATES PATENT OFFICE 18,955

SAFETY RAZOR

Joseph Muros, Belmont, Mass., assignor to Gillette Safety Razor Company, Boston, Mass., a corporation of Delaware Original No. 1,900,069, dated March 7, 1933; Serial No. 618,731, June 22, 1932. Application for reissue July 27, 1933. Serial No. 682,527

8 Claims. (Cl. 30—12)

This invention relates to safety razors of the type in which a thin, flexible blade is shaped between co-operating, blade-holding members and maintained by them in a position of transverse curvature for shaving. The invention comprises a novel razor construction in which the position and relation of these members may be controlled more conveniently by the user and their movement toward and from blade-clamping position effected more rapidly and by means of less mechanism than in razors of this type heretofore known. In one aspect, my invention consists in improvements upon the construction disclosed in the co-pending application of Nicholas Testi, Serial No. 609,784, filed May 7, 1932. In another aspect, the invention comprises improvements of general application to and utility in safety razors of other types.

In embodying my invention in a safety razor having co-operating, blade-holding members, either of the two members may be made sectional and such sections separately pivoted at the outer edges of the other so that they may be swung toward and from a superposed blade-shaping position. An important feature of the present invention consists in operating mechanism for the pivoted sections acting to impart a quick-swinging movement to the sections followed, in the proper sequence, by a slow-flexing movement. It will be apparent that the movement of the sections in swinging from their open, inoperative position into a position in light engagement with the blade, or nearly so, may be effected rapidly, since there is no strain on the sections and no work imposed upon them. On the other hand, after the swinging sections have been brought into engagement with the blade, they are called upon for a further movement in which the blade is flexed and securely clamped in shaving position. This movement is through a relatively short arc but may require a considerable amount of pressure. It can, therefore, be effected with advantage at a slower rate of movement than the preliminary movement of the sections first discussed. This condition has been recognized heretofore and in the application of Testi, above referred to, separate trains of mechanism are provided, one being operative for effecting the rapid-swinging movement of the sections through a long arc and the other effective to move the sections slowly through a short arc. The present invention contemplates a single mechanism which is effective for bringing about both the movements of the cap sections above discussed. As herein shown, the desired results are secured by providing in each cap section, a cam surface having a quick-swinging portion and a slow-locking portion, and a handle member having operating elements co-acting with said cam surfaces, first to swing the cap sections simultaneously rapidly and then move them slowly into blade-flexing position. The quick-swinging portion of the cam may be so designed that the cap sections are moved rapidly through a wide arc in the preliminary movement of the handle member and then in the continued movement of this member the slow-flexing movement of the sections is effected through a small arc. The mechanism above outlined is not only simple and convenient for the user, but it is positive in its action and insures positively that the quick-swinging and slow-flexing movements shall be effective in the proper sequence, without loss of time and without requiring particular attention of the user.

These and other features of the invention will be best understood and appreciated from the following description of a preferred embodiment thereof selected for purposes of illustration and shown in the accompanying drawing, in which Fig. 1 is a view in perspective on an enlarged scale of the complete razor;

Figure 1:
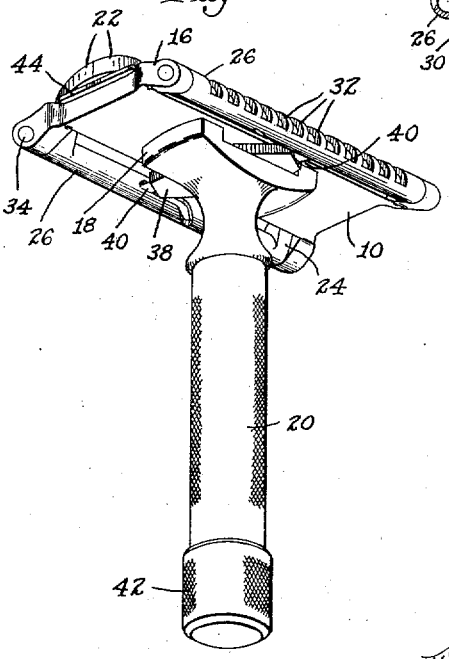

The blade-supporting member 10 of the razor comprises an elongated plate having parallel, longitudinally-extending shoulders 12 over which the blade is flexed and blade-locating studs 14 herein shown as being diamond-shaped. At each of its corners, the blade-supporting member 10 is provided with a downwardly and outwardly-extending arm 16 and between these arms the cap sections are pivotally mounted, as will presently be explained. The member 10 is rigidly secured at its lower face to a forked head 18 which comprises a part of the razor handle. The head 18 is shouldered at its lower end to receive a cylindrical barrel 20 which constitutes the body of the handle.

Figure 2:
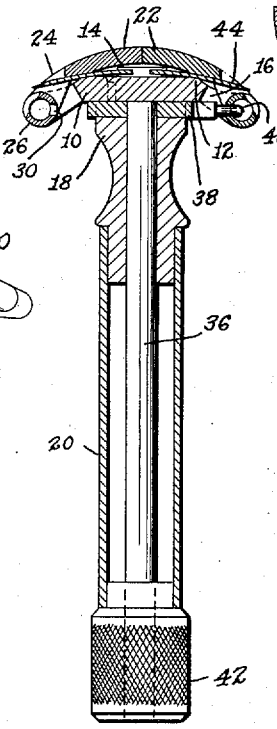
Fig. 2 is a view in cross section showing the razor in shaving condition.
Figure 3:
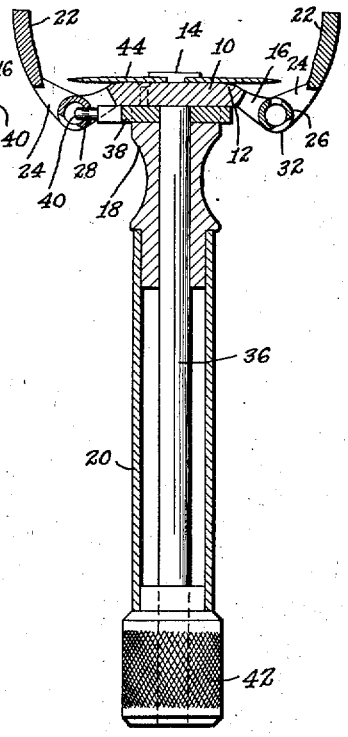
Fig. 3 is a similar view showing the cap sections in opened or blade-exposing position.
Figure 4:
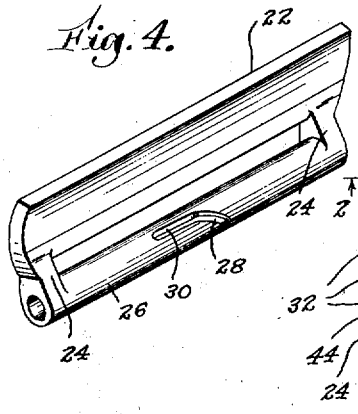
Fig. 4 is a view in perspective on a still larger scale of one of the cap sections.
Figure 5:
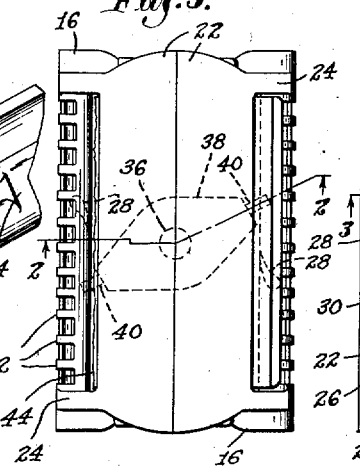
Fig. 5 is a plan view of the razor in the position shown in Fig. 2.

The cap of the razor comprises two co-operating cap sections 22, each comprising a curved wing portion shaped to overlie the blade-supporting member 10 and to co-operate therewith in positioning and clamping the blade in shaving position. Each cap section includes also an elongated barrel, or hub portion 26 to which the body of the cap section is connected by spaced arms 24 surfaced at their outer faces to fit within the arms 16 of the blade-supporting member 10. The cap sections 22 are mounted respectively at the outer edges of the blade-supporting member 10 by pivot pins 34 which extend through the bearing arms 16 and enter the ends of the barrel portions 26 of the cap sections. The free edge of each cap section 22 is formed as a flat surface and these are arranged substantially to meet in central position when the cap sections are occupying their closed position, as shown in Figs. 2 and 5. The barrel portion 26 of each cam section is provided with a cam slot which constitutes one element of quick-swinging and slow-locking mechanism for the cap section. To this end, one portion 28 of the cam slot is shaped as a steep spiral and this merges into the second portion 30 of the cam slot which is shaped as a flat spiral. The cam slots 28—30 are located substantially centrally in the barrel portions 26 of the two cap sections but are oppositely-disposed, that is, the steep spiral portions 28 of the cam slots are directed toward opposite ends of the razor. Each barrel portion 26 is provided on one side with spaced guard teeth 32 and these teeth are arranged to be positioned properly for shaving when the cap sections are closed and, of course, to move into an inoperative position when the cap sections are open. It will be understood that the cap sections 22 are thus mounted to swing freely from closed, blade-clamping position above the blade-supporting member 10, as shown in Figs. 2 and 5, to open or blade-releasing position, as shown in Figs. 3 and 6, wherein the face of the blade-supporting member is entirely unobstructed so that presentation or removal of the blade is facilitated.

Journaled centrally in the forked head 18 is an elongated spindle 36 having at its lower end a knurled nut 42 shouldered to enter the lower end of the barrel 20 and affording convenient means for operating the spindle 36. The spindle 36 extends upwardly into the space between the arms of the forked head 18 where it is provided with a flat, transversely extending head 38 arranged to swing in the space between the body of the head 38 and the underside of the blade-supporting member 10. The head 38 is thus located in the plane determined by the axes of the barrel portions 26 and it is provided at each end with a cylindrical pin 40 arranged to enter the cam slot 28—30 of one of the barrel portions 26 and to swing said barrel portion about the axis of the pins 34 when moved longitudinally of the cam slot.

Figure 6:
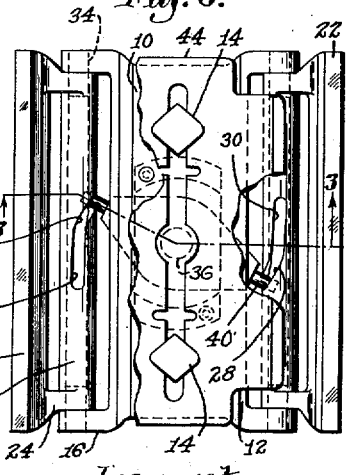
Fig. 6 is a plan view of the razor in the position shown in Fig. 3, a portion of the blade being broken away to show the construction of the parts beneath.

A blade 44, suitable for use in the illustrated razor, is shown in Fig. 6. This is provided with a longitudinally-extending slot having enlargements shaped to fit upon the diamond-shaped, blade-locating studs 14, and with sharpened edges which extend outwardly beyond the shoulders 12 of the blade-supporting member when the blade is positioned thereon. In this position of the blade, as shown in Fig. 3, it will be noted that the sharpened edges of the blade are located oppositely to the spaces provided in the cap sections by the arms 24. Clearance is thus provided permitting the cap sections to be swung from open to closed position and vice versa, without contacting with or in any way dulling the keen shaving edge of the blade. The blade 44 is herein shown as being provided at either end with an elongated, unsharpened portion of reduced width defined by reentrant recesses in the corners of the blade and these elongated end portions project slightly beyond the ends of the blade-supporting member 10, when the blade is positioned thereon, and facilitate removing the blade therefrom.

The razor herein illustrated is intended to be operated in the following manner:

Assuming that it is in its opened position, as shown in Figs. 3 and 6, and that the blade 44 is positioned on the blade-supporting member 10, as already explained, it will be found that the pins 40 of the head 38 are located at the extreme end of the steep spiral cam portion 28 of the cam slot in the barrel portions 26 of the cap section. The knurled nut or head 42 may now be turned in a clock-wise direction by the right hand of the user while the handle barrel 20 is held stationary in his left hand. The head 38 is thus swung to carry the pins 40 along the steep portion 28 of the cam slot and consequently to swing both cap sections rapidly from their open, blade-exposing position toward their closed, blade-shaping and clamping position. This movement of the cap sections is effected against no resistance and may be made very rapid since it involves nothing beyond the actual movement of the light, cap sections. This preliminary, quick-swinging movement of the cap sections brings them into superposed position above the blade, or possibly into light engagement with the blade, but terminates before the blade-flexing movement of the cap sections begins. An angular movement of between 30° and 40° of the head 38 is sufficient to effect this quick-swinging movement of the cap sections and to carry both pins 40 to the point at which the flatter portions 30 of the cam slots begin. Continued turning movement of the head 38 carries the pins 40 along these flat portions of the cam slots and in this movement, a slow and powerful, non-reversible, clamping movement is imparted to the cap sections, flexing the blade over the fulcrum shoulders 12 from the flat position, shown in Fig. 3, to a position of pronounced transverse curvature. The knurled head 42 may be safely released with the pin 40 at any point in the portion 30 of the cam slots and the cap sections will be reliably held in a corresponding blade-flexing position. When the cap sections 22 are closed to the extreme limit of their clamping position and maximum curvature thereby imparted to the blade 44, the condition of minimum edge exposure is established; that is to say, the effective width of the blade is reduced to its minimum. By terminating the movement of the head 38 short of this point or by reversely turning the head slightly, the clamping pressure upon the blade may be relaxed so that it is permitted to straighten slightly and increase the extent of its blade exposure.

As already intimated, the cap sections are reliably maintained in any intermediate position of adjustment on account of the engagement of the pins 40 with the flat portions 30 of the cam slots. It will thus be seen that I have provided a single mechanism wherein the free movement of the cap sections is effected rapidly and by small angular movement of the operating head 42 and the blade-clamping movement of the cap sections, which requires appreciable pressure, is effected by further movement in the same direction of the same operating head 42 under conditions supplying the proper mechanical advantage to the swinging parts.

Having thus described my invention, what I claim as new and desire to secure by Letters Patent of the United States is:—

1. A safety razor comprising a blade-supporting member, cap sections pivotally mounted at both longitudinal edges thereof and provided with one element of a quick-swinging and slow-locking mechanism, said element determining the timing of the cap section movement, and a rotatable handle member which supplies the co-operating element of said mechanism.

2. A safety razor comprising a blade-supporting member, a cap member pivotally mounted at a longitudinal edge thereof to swing into superposed position thereon and having a cam element with a quick-swinging face merging into a slow-locking face, and a handle member having an operating element co-acting with said cam element.

3. A safety razor comprising a blade-supporting member, co-operating cap sections pivotally mounted at the longitudinal edges thereof and each provided with a cam surface having a quick-swinging portion and a slow-locking portion, and a handle member having operating elements co-acting with said cam surfaces first to swing the cap sections simultaneously rapidly and then move them slowly to blade-flexing position.

4. A safety razor comprising a blade-supporting member, co-operating cap sections pivotally mounted at its opposite edges and arranged to swing to and from a superposed blade-flexing position, a rotatable handle element and a train of mechanism between said element and both cap sections including continuous cam surfaces shaped to swing them simultaneously, first rapidly to engage the blade and then slowly to flex the blade in the continuous rotation of said handle element.

5. A safety razor comprising a blade-supporting member, co-operating cap sections pivotally mounted at either edge thereof and movable from open position into the blade-flexing position superposed above said member, each section having a short steep cam surface merging into a longer flat cam surface in a location out of line with its axis, and an operating handle with connections operating to swing the sections by reacting with said cam surfaces.

6. A safety razor comprising a blade-supporting member, a cap section having a longitudinally-disposed barrel pivotally mounted at each side of said blade-supporting member, each barrel having a cam slot therein having a steep portion and a portion of less pitch which is directed, in the two barrels respectively, toward an opposite end of the razor, and an operating head having oppositely moving connections with said cam slots.

7. A safety razor comprising a blade-supporting member, pivotally mounted cap sections thereon, and a rotatable handle member having cam connections for swinging said sections, said connections including continuous cam surfaces shaped to move the sections rapidly through a wide arc toward blade-flexing position and then to move them slowly through a short arc for flexing the blade.

8. A safety razor comprising a blade-supporting member, pivotally mounted cap sections thereon, a rotatable head having oppositely-directed operating pins, and cam slots in the cap sections to receive said pins, the slots being shaped to impart a quick-closing movement to the cap sections through a wide arc during the movement of the head through a short arc and a slow clamping and locking movement to the cap sections through a short arc during the subsequent movement of the head through a relatively longer arc.

JOSEPH MUROS.